US012718073B1

(12) United States Patent
Ardazi et al.

(10) Patent No.: US 12,718,073 B1
(45) Date of Patent: Aug. 25, 2026

(54) HIERARCHICAL GENERATIVE AI SYSTEM AND METHOD UTILIZING LOGIT-BASED REASONING TRANSFER BETWEEN MODELS

(71) Applicant: INTUIT INC., Mountain View, CA (US)

(72) Inventors: Shai Ardazi, Tel Aviv (IL); Amir Bialer, Tel-Aviv (IL); Matan Vetzler, 'Givat Shmuel (IL); Linoy Cohen, New York City, NY (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 19/372,913

(22) Filed: Oct. 29, 2025

(51) Int. Cl.

| | |
|---|---|
| ***G06N 3/0475*** | (2023.01) |
| ***G06N 3/0455*** | (2023.01) |
| ***G06N 3/048*** | (2023.01) |
| ***G06N 3/063*** | (2023.01) |
| ***G06N 3/08*** | (2023.01) |

(52) U.S. Cl.
CPC ......... *G06N 3/0475* (2023.01); *G06N 3/0455* (2023.01); *G06N 3/048* (2023.01); *G06N 3/063* (2013.01); *G06N 3/08* (2013.01)

(58) Field of Classification Search
None
See application file for complete search history.

(56) References Cited

PUBLICATIONS

Lee et al., Can Small Language Models Help Large Language Models Reason Better?: LM-Guided Chain-of-Thought; LREC-COLING 2024; pp. 2835-2843; May 20-25, 2024. (Year: 2024).*

Hinton et al., Distilling the Knowledge in a Neural Network; arXiv:1503.02531v1 [stat.ML] Mar. 9, 2015; Total pp. 9 (Year: 2015).*

McCartor, Hal., Back propagation implementation on the adaptive solutions CNAPS neurocomputer chip; Advances in Neural Information Processing Systems 3 (1990); pp. 1028-1031 (Year: 1990).*

Leviathan et al., Fast Inference from Transformers via Speculative Decoding, Proceedings of the 40 th International Conference on Machine Learning, Honolulu, Hawaii, USA. PMLR 202; 2023; Total pp. 13 (Year: 2023).*

Hsieh et al., Distilling Step-by-Step! Outperforming Larger Language Models with Less Training Data and Smaller Model Sizes; ACL 2023; Jul. 9-14, 2023; pp. 8003-8017 (Year: 2023).*

Li et al., Symbolic Chain-of-Thought Distillation: Small Models Can Also "Think" Step-by-Step; arXiv:2306.14050v2 [cs.CL] Apr. 15, 2024; Total pp. 13 (Year: 2024).*

* cited by examiner

*Primary Examiner* — Alan Chen
(74) *Attorney, Agent, or Firm* — Patterson + Sheridan, LLP

(57) ABSTRACT

Aspects of the present disclosure relate to optimized generative machine learning systems. Embodiments include a generative machine learning model that comprises multiple sets of hidden decoder layers. In certain embodiments, a first set of decoder layers having a relatively small number of synaptic weights is used to generate reasoning steps for the model. The second set of decoder layers may have a larger number of synaptic weights than the first set, and the second set may be used to generate tokens of the response based on the reasoning steps. In some embodiments, each set of decoder layers comprise a plurality of neurons organized in an array, wherein each neuron comprises a register, a microprocessor, and at least one input. The neurons may be connected using synaptic circuitry.

12 Claims, 5 Drawing Sheets

HIERARCHICAL GENERATIVE AI SYSTEM AND METHOD UTILIZING LOGIT-BASED REASONING TRANSFER BETWEEN MODELS

INTRODUCTION

Aspects of the present disclosure relate to optimized generative machine learning systems that minimize the amount of time and computational resources required to generate accurate outputs. In particular, embodiments disclosed herein relate to using a relatively small generative model to generate intermediate reasoning steps, while a larger and more accurate model is used to generate the final output based on the reasoning steps.

BACKGROUND

Generative artificial intelligence systems are used by a growing number of people, businesses, and organizations around the world to automate tasks. These systems rely on generative machine learning models to generate responses to inputs (such as queries submitted by users or queries submitted by automated processes). For example, a user query may include a question. A generative machine learning model may generate an answer to the question, and the answer may then be provided to the user.

To improve the accuracy and quality of responses, many machine learning technologies generate intermediate outputs known as reasoning steps. Reasoning steps provide a structured outline that allows a machine learning model to process complex tasks as smaller, more objective logical components. Generating these intermediate outputs allows the model to systematically synthesize relevant information before producing a final response. As a result, the model may avoid errors and generate complete and high-quality responses that are free of hallucinations.

However, the generation of reasoning steps can lead to excessive latency and resource consumption for generative machine learning models. For example, each token of a reasoning step may require a full forward pass through a machine learning model. And for complicated responses, the reasoning steps may contain thousands of tokens. As a result, for large models with several billions of parameters, a large amount of computational and energy resources may be required to generate responses. This problem may severely limit the ability to deploy a machine learning-based system at scale to many users.

Thus, there is a need in the art for improved generative machine learning systems.

BRIEF SUMMARY

Certain embodiments provide a generative machine learning system. The generative machine learning system generally includes: a first set of decoder layers configured to generate a first set of logits corresponding to one or more reasoning steps, wherein the first set of decoder layers has a first number of parameters; a second set of decoder layers configured to generate a second set of logits corresponding to tokens of a response to an input prompt based on the first set of logits, wherein the second set of decoder layers has a second number of parameters, and wherein the second number of parameters is larger than the first number of parameters; and an activation layer configured to generate the response based on the second set of logits.

Some embodiments provide a method. The method generally includes: generating, using a given generative machine learning model comprising a first number of parameters, one or more reasoning steps related to an input prompt; transmitting the one or more reasoning steps to a particular generative machine learning model comprising a second number of parameters, wherein the second number of parameters is larger than the first number of parameters; and generating, using the particular generative machine learning model, a response to the input prompt based on the one or more reasoning steps.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer-readable mediums for optimizing a generative machine learning model.

According to some embodiments, a generative machine learning system may generate responses (e.g., responses to user queries) using a decoder architecture that includes both a smaller machine learning model and a larger machine learning model. The smaller machine learning model may be used to generate reasoning steps for a response. Then, the larger model may be used to generate the response based on the reasoning steps. The larger model may have a significantly larger number of parameters than the smaller model (e.g., the larger model may have over four hundred billion parameters, while the smaller model may have fewer than ten billion parameters). Thus, the larger model may be significantly more powerful than the smaller model, but the smaller model may be significantly more efficient (e.g., the smaller model may be quicker and the smaller model may consume fewer computational and energy resources). To improve the accuracy of the smaller model, the smaller model may be trained to replicate reasoning steps generated by the larger model (e.g., based on adjusting parameters of the smaller model until reasoning steps generated by the smaller model are similar to reasoning steps generated by the larger model). Thus, the smaller model may be able to accurately generate reasoning steps that are similar to reasoning steps generated by the larger model. Accordingly, the highly efficient smaller model may be used to generate reasoning steps that are then used by the larger model to generate a response.

Embodiments of the present disclosure provide numerous technical and practical effects and benefits. Specifically, because embodiments disclosed herein do not require using a larger model to accurately generate reasoning steps, the amount of computational and energy resources consumed in a response generation process may be significantly reduced, thereby improving the functioning of computing devices involved. Also, the amount of latency of a generative machine learning system may be significantly reduced, since the smaller model may generate reasoning steps much faster than the larger model. These technical improvements make deploying a generative machine learning system at scale to large amounts of users significantly more practical and efficient.

Example Computing Components Related to a Generative Machine Learning System

Figure 1:
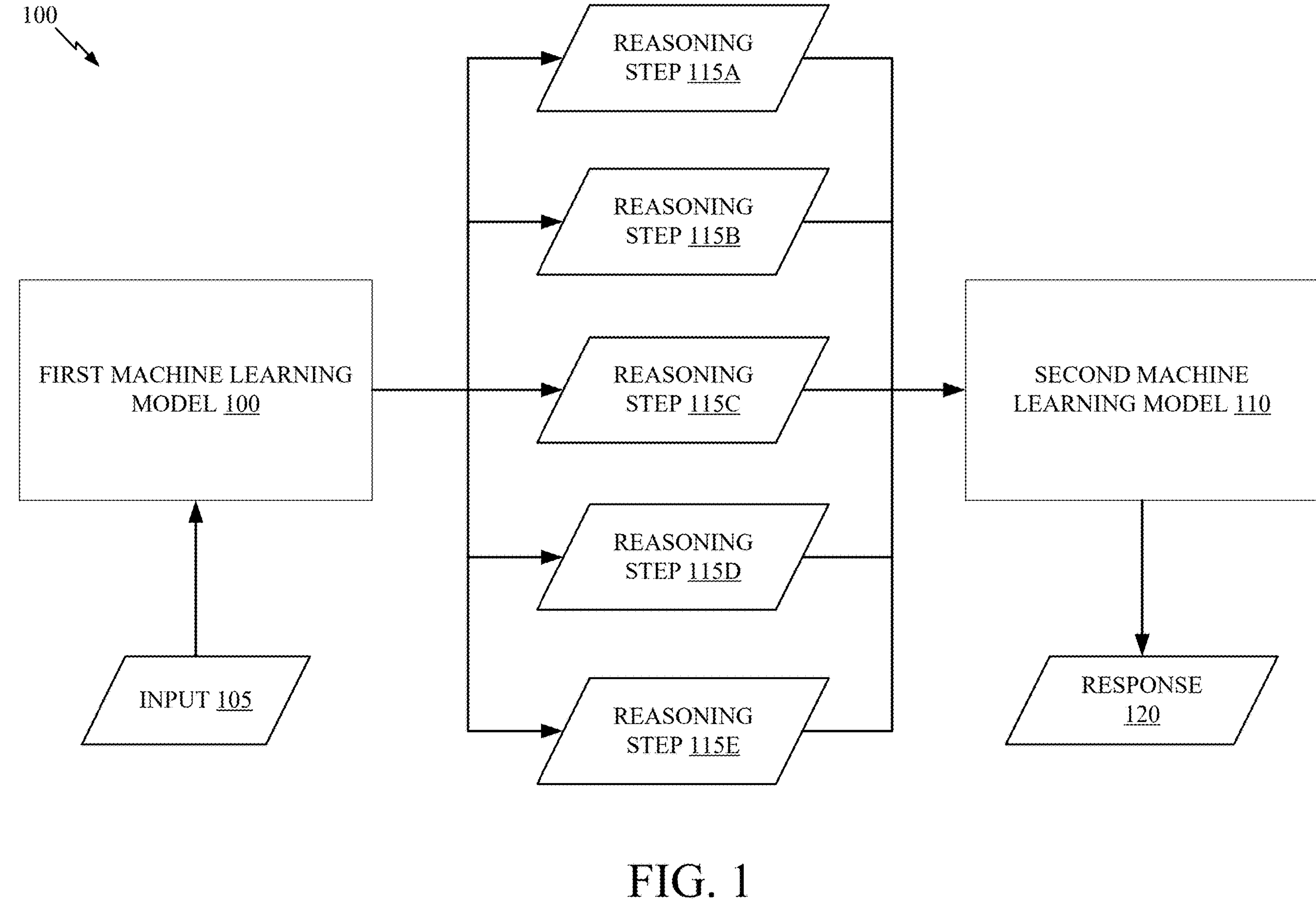
FIG. 1 depicts an example of computing components related to a generative machine learning system according to embodiments disclosed herein.

FIG. 1 depicts an example of computing components according to embodiments disclosed herein.

The generative machine learning system 100 depicted in FIG. 1 includes first machine learning model 100 and second machine learning model 110. First machine learning model 100 and second machine learning model 110 may generally be any type of generative machine learning model (otherwise known as language processing machine learning models) such as transformer-based models (e.g., large language models (LLMs)). First machine learning model 100 may have a smaller number of parameters than second machine learning model 110. For example, second machine learning model 110 may be a full LLM with more than four hundred billion parameters, whereas first machine learning model 100 may be a much smaller language processing machine learning model with fewer than ten billion parameters. These numbers of parameters are included as examples, and other numbers of parameters may be used.

Input 105 may include a prompt submitted by a user (and/or a prompt automatically generated by an automated process). The prompt may include a natural language request, command, question, and/or the like. As described in further detail below, first machine learning model 100 and second machine learning model 110 may be used to generate a response 120 to the input 105. The response 120 may include, as an example, an answer to a question included within the input 105.

To improve the quality and accuracy of responses, the generative machine learning system may generate reasoning steps during the process of generating a response. The reasoning steps are generally intermediate steps toward generating the response. For example, the reasoning steps may include intermediate steps for performing a task that is necessary for generating a response to a prompt. Typically, generative machine learning systems that generate reasoning steps as part of generating a response produce fewer response hallucinations and more detailed responses than generative systems that do not generate reasoning steps (e.g., hallucinations may refer to model outputs that contain inaccurate and/or false information).

As an illustrative example, the input 105 may include the question: "where is Yellowstone National Park located?" Based on this question, first machine learning model 100 may generate reasoning steps 115A-C. In this example, reasoning step 115A may include the statement: "Yellowstone National Park is located in the western United States." Reasoning step 115B may include the question: "in which state(s) of the United States is Yellowstone National Park located?" Accordingly, reasoning step 115B sets forth a task that is required for answering the question; specifically, determining which states include Yellowstone National Park. Reasoning steps 115C-E include the results of performing this task. Reasoning step 115C may include the statement: "the majority of Yellowstone National Park is located in Wyoming." Reasoning step 115D may include the statement: "a relatively small portion of Yellowstone National Park is located in Idaho." Reasoning step 115E may include the statement: "a relatively small portion of Yellowstone National Park is located in Montana." Based on these reasoning steps, the second machine learning model 110 may generate a response 120 that includes the following statement: "Yellowstone National Park is located in the western United States. Specifically, the borders of Yellowstone National Park are located within the states of Wyoming, Idaho, and Montana, with the majority of the park's territory being within Wyoming." By contrast, a generative machine learning model that does not generate reasoning steps may generate the output: "Yellowstone National Park is located in Wyoming." This response is not fully accurate, since it omits two of the states in which the park is located.

According to certain embodiments, the reasoning steps (or portions thereof) are included in the response. For example, a response may include several paragraphs of text, and a reasoning step may be used as one of the paragraphs or a sentence within a paragraph. In some embodiments, the response is synthesized based on the reasoning steps. For example, a response may be a newly-generated text that includes information found within the reasoning steps. Certain embodiments provide that the response is generated based on performing a task indicated within a reasoning step. For example, a reasoning step may indicate that a certain type of information should be retrieved in order to generate the response. Based on this reasoning step, the information may be retrieved and provided to the second machine learning model 110. Then, the response may include the retrieved information.

In certain embodiments, the second machine learning model 110 may generate the response 120 based on ranking the reasoning steps. For example, only the most important/relevant reasoning steps may be used to generate responses when such ranking is used. In an illustrative example, the first model 100 may generate reasoning steps that are not accurate or important for generating a response (e.g., the first model 100 may generate a reasoning step that says that Yellowstone National Park is located in South Dakota). Such a reasoning step may receive a low rank due to the inaccuracy/irrelevance of the step. Thus, the step may not be used to generate a response (e.g., the second model 110 may not list South Dakota among the states that include Yellowstone National Park).

Conventional generative machine learning technologies that utilize reasoning steps may use the same model to generate the reasoning steps and the response. However, embodiments disclosed herein use the smaller first machine learning model 100 to generate the reasoning steps and the larger second machine learning model 110 to generate the response based on the reasoning steps. By using this approach, embodiments disclosed herein allow for taking advantage of both the efficiency of the first machine learning model 100 and the accuracy of the second machine learning model 110. Accordingly, the amount of forward passes through the larger model may be significantly reduced compared to techniques that use a larger model to generate both the reasoning steps and the response.

The accuracy of the first machine learning model 100 may be improved by training the first machine learning model 100 based on reasoning steps generated by the second machine learning model 110. The training process used to train the first machine learning model 100 may involve supervised, unsupervised or semi-supervised learning techniques. Supervised learning techniques generally involve providing training inputs to a machine learning model (or one or more layers thereof). The machine learning model processes the training inputs and outputs predictions based on the training inputs. The predictions are compared to known labels associated with the training inputs to determine the accuracy of the machine learning model, and parameters of the machine learning model are iteratively adjusted until one or more conditions are met. For instance, the one or more conditions may relate to an objective function (e.g., a cost function or loss function) for optimizing one or more variables (e.g., model accuracy). In some embodiments, the conditions may relate to whether the predictions produced by the machine learning model based on the training inputs match the known labels associated with the training inputs or whether a measure of error between training iterations is not decreasing or not decreasing more than a threshold amount. The conditions may also include whether a training iteration limit has been reached. Model parameters adjusted during training may include, for example, hyperparameters, values related to numbers of iterations, weights, functions used by nodes to calculate scores, level of randomness, and/or the like. In some embodiments, validation and testing are also performed for a machine learning model (e.g., first machine learning model 100 and/or any other model/layer used in techniques described herein), such as based on validation data and test data, as is known in the art.

In an example supervised learning process, first machine learning model 100 receives input prompts and generates reasoning steps. The output reasoning steps generated by the first machine learning model 100 are then compared to reasoning steps generated by second machine learning model 110 for the same prompts. The parameters of first machine learning model 100 are adjusted to minimize the difference between its reasoning steps and those of second machine learning model 110, often using techniques such as semantic similarity comparisons or embedding-based loss functions. This iterative process enables first machine learning model 100 to replicate the outputs of second machine learning model 110.

The comparison of the output reasoning steps generated by the first machine learning model 100 to the output reasoning steps generated by the second machine learning model 110 may involve generating embedding representations of the reasoning steps. An embedding generally refers to a vector representation of an entity that represents the entity as a vector in n-dimensional space such that similar entities are represented by vectors that are close to one another in the n-dimensional space. Embeddings may be generated through the use of an embedding model, such as a Bidirectional Encoder Representations from Transformer (BERT) model or a similar model used to generate embeddings. The embedding representations may be compared using a semantic similarity algorithm such as cosine similarity, Euclidean distance, and/or the like. Generally, the closer two embeddings are in an embedding space, the more similar the embeddings are.

Example Generative Machine Learning Model

Figure 2:
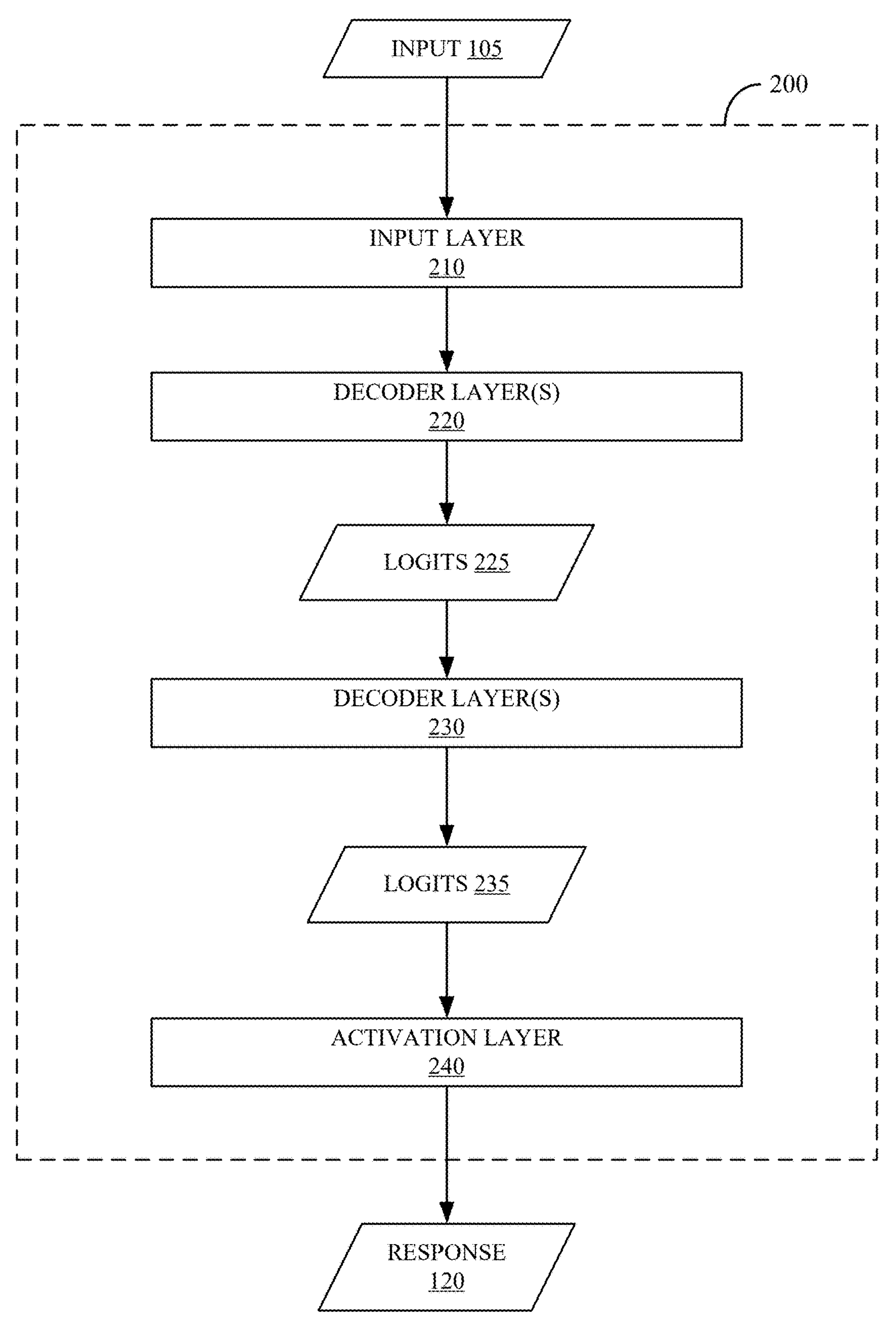
FIG. 2 depicts an example of a generative machine learning model according to embodiments disclosed herein.

FIG. 2 depicts an example generative machine learning model 200 according to embodiments disclosed herein.

The generative machine learning model 200 may generally be any type of generative artificial intelligence model, such as a neural network-based model. The generative machine learning model 200 comprises a multitude of layers. The first layer is input layer 210, which may process inputs provided to the model 200. For example, the first layer may comprise activation functions and/or encoder layer(s). An encoder layer may generate a vector representation (e.g., an embedding representation) of the input 105 to the model 200. As shown in this example, the generative machine learning model 200 is used to generate a response 120 to the input 105, as described above with respect to FIG. 1.

The generative machine learning model 200 further includes a first set of decoder layers 220. The decoder layers 220 (which may also be referred to as hidden layers of the model 200) may process an output generated by the input layer 210. The product of the processing performed by the decoder layers 220 (also referred to as a hidden state of the generative machine learning model 200) may be logits, which are un-normalized probabilities that represent the likelihoods of tokens. The logits may be processed by an activation layer, which may generate a probability distribution that is then converted into tokens. In some embodiments, the activation layer implements an activation function such as a softmax function to generate the probability distribution.

Decoder layers 220 may correspond to first machine learning model 100 of FIG. 1. These decoder layers 220 may be configured (e.g., trained, prompted, and/or the like) to generate reasoning steps. Thus, the logits 225 may correspond to likelihoods of tokens for reasoning steps. These logits 225 may be converted into tokens (e.g., by an activation layer) and provided as input to decoder layers 230. Alternately, the logits 225 may be transmitted directly to decoder layers 230. Decoder layers 220 may be trained as described above with respect to FIG. 1, such that reasoning steps generated by decoder layers 220 resemble reasoning steps generated by a larger model with a larger number of parameters.

Decoder layers 230 may correspond to second machine learning model 110 of FIG. 1. These decoder layers 230 may have a larger amount of parameters (e.g., synaptic weights) than decoder layers 220. Decoder layers 230 may be used to generate the response 120 based on the reasoning steps generated by decoder layers 220. For instance, the decoder layers 220 may process logits 225 (or tokens generated based on logits 225) in order to generate logits 235. Logits 235 may correspond to likelihoods of tokens for the response 120. These logits 235 may be converted into tokens by activation layer 240 (e.g., which may comprise a softmax function that generates a probability distribution). For example, a probability distribution generated by activation layer 240 based on the logits 235 may be used to generate the tokens of response 120.

The process of generating logits and converting the probabilities into tokens (both for reasoning steps and for the response 120) may be completed until the response 120 is fully generated.

Architecture of the Example Generative Machine Learning Model

The generative machine learning model 200 may be implemented using hardware and/or software. Each of the layers of the generative machine learning model 200 (e.g., input layer 210, decoder layers 220 and 230, and/or activation layer 240) may comprise one or more neurons arranged in one or more neuron arrays. In an example embodiment, a neuron may comprise a register, a microprocessor, and at least one input. Each neuron produces an output, or activation, based on an activation function that uses the outputs of the previous layer and a set of weights as inputs. Each neuron in a neuron array may be connected to another neuron via a synaptic circuit. A synaptic circuit may include a memory for storing a synaptic weight (e.g., synaptic weights may be an example of parameters of a model in some embodiments). An example machine learning model may be a neural network having an input layer, an output layer, and a plurality of fully connected hidden layers (e.g., decoder layers 220 and 230). In some embodiments, a machine learning model may be implemented by an application-specific integrated circuit (ASIC). ASICs may be specially customized for a specific artificial intelligence application and provide superior computing capabilities and reduced electricity consumption compared to traditional CPUs.

The generative machine learning model 200 may further include one or more encoder layers, such as an encoder found in a Bidirectional Encoder Representations from Transformer (BERT) model or a similar model used to generate embeddings. These encoder layers may be used to generate embedding representations of outputs generated by decoder layers 220 and 230. For example, as part of a training process for decoder layers 220, a training prompt may be provided as input to decoder layers 220. The same training prompt may be provided to decoder layers 230. Based on this training prompt, decoder layers 220 and 230 may each generate reasoning steps. The encoder layers may be used to generate embedding representations of the reasoning steps. The embedding representations may then be compared using a semantic similarity algorithm, and parameters of decoder layers 220 may be automatically adjusted until the variance between the reasoning steps falls below a threshold (e.g., such that reasoning steps generated by decoder layers 220 are similar to reasoning steps generated by decoder layers 230).

Figure 3:
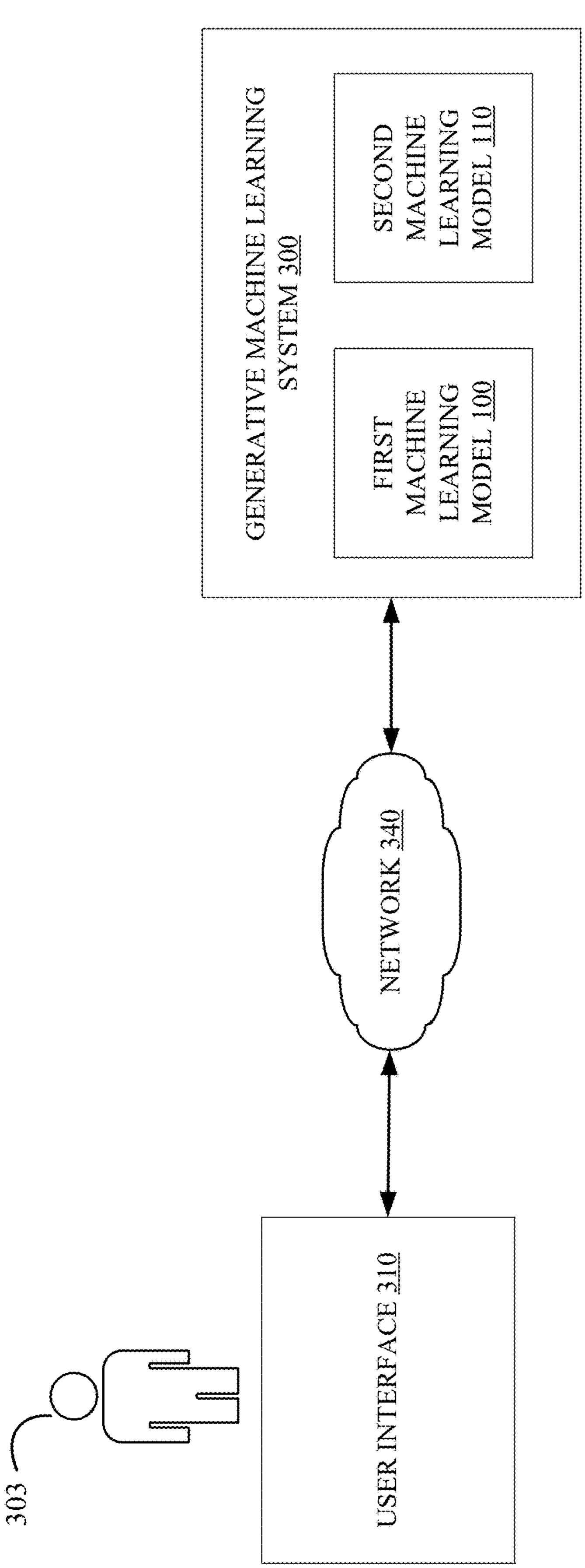
FIG. 3 depicts an additional example of computing components related to a generative machine learning system according to embodiments disclosed herein.

Additional Example Computing Components Related to a Generative Machine Learning System FIG. 3 depicts an additional example of computing components according to embodiments disclosed herein.

A user 303 may interact with a generative machine learning system 300 via a user interface 310 associated with a computing device (e.g., a mobile or desktop computer). The user 303 may submit queries via the user interface 310, and responses generated by the generative machine learning system 300 based on the queries may be presented to the user 303 via the user interface 310.

As described above with respect to FIG. 1, the generative machine learning system 300 may include both a first machine learning model 100 and a second machine learning model 110. The first model 100 is typically a smaller, faster model with fewer parameters, optimized for rapid generation of reasoning steps in response to an input (e.g., a prompt submitted by user 303).

The second model 110, on the other hand, is generally a larger, more sophisticated model with a greater number of parameters. It is designed to provide higher accuracy and reliability in token generation. As described above with respect to FIG. 1, the second model 110 may be used to generate responses based on the reasoning steps generated by the first model 100.

This dual-model architecture allows the system 300 to balance speed and accuracy. The first model 100 accelerates the reasoning step generation process, producing reasoning steps that are of similar quality to reasoning steps that would be generated by the second model 110. Then, the second model 110 generates a response based on the reasoning steps generated by the first model 100. Because the second model 110 has a relatively large number of parameters (and is thus highly accurate), the second model 110 may be able to generate an accurate response even if the reasoning steps generated by the first model contain inaccuracies or insufficiencies. However, because the second model 110 was not used to generate the reasoning steps, a significant amount of computational and energy resources may be conserved, and a significant amount of latency may be avoided.

As shown in this example, the user interface 310 and generative machine learning system 300 interact over a network 340 (e.g., data may be transmitted from the generative machine learning system 300 to the user device over network 340). Network 340 may be any connection over which data may be transmitted. In one example, network 340 is the Internet. Other embodiments provide that generative machine learning system 300 is implemented locally with respect to a user device.

Example Operations Related to Generative Machine Learning Systems

Figure 4:
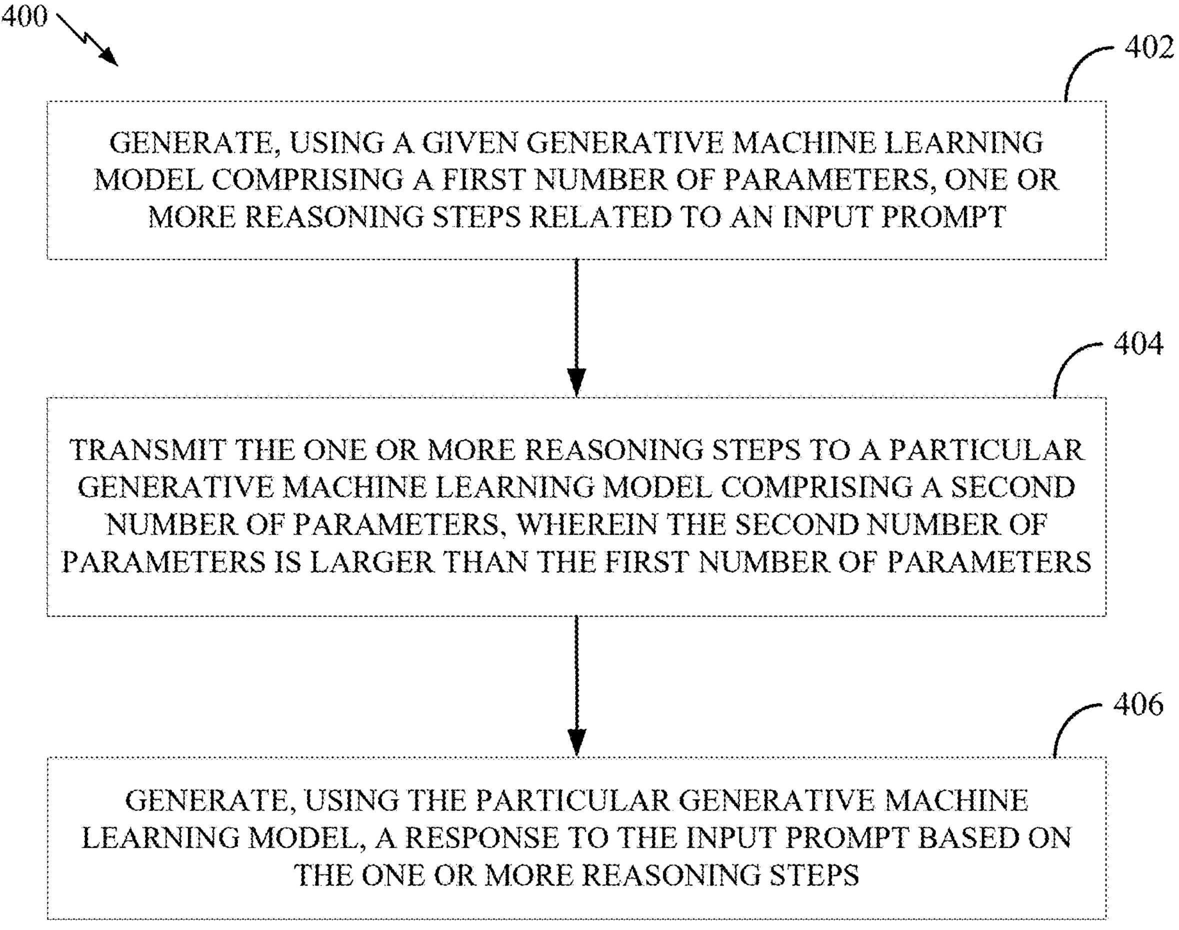
FIG. 4 depicts example operations related to generative machine learning systems according to embodiments disclosed herein.

FIG. 4 depicts example operations 400 related to generative machine learning systems. For example, operations 400 may be performed by one or more of the components described with respect to FIG. 1, FIG. 2, and FIG. 3.

Operations 400 begin at step 402 with generating, using a given generative machine learning model comprising a first number of parameters, one or more reasoning steps related to an input prompt. Some embodiments provide that the given generative machine learning model is trained based on reasoning steps generated by the particular generative machine learning model. According to certain embodiments, training the given generative machine learning model comprises: providing a training prompt as input to the given generative machine learning model; comparing a reasoning step generated by the given generative machine learning model in response to the training prompt to a reasoning step generated by the particular generative machine learning model based on the training prompt; and adjusting parameters of the given generative machine learning model based on a variance between the reasoning step generated by the given generative machine learning model and the reasoning step generated by the particular generative machine learning model. In some embodiments, the comparing comprises a semantic similarity comparison involving an embedding representation of the reasoning step generated by the given generative machine learning model and an embedding representation of the reasoning step generated by the particular generative machine learning model.

Operations 400 continue at step 404 with transmitting the one or more reasoning steps to a particular generative machine learning model comprising a second number of parameters, wherein the second number of parameters is larger than the first number of parameters.

Operations 400 continue at step 406 with generating, using the particular generative machine learning model, a response to the input prompt based on the one or more reasoning steps. Certain embodiments provide that the one or more reasoning steps comprise an intermediate step associated with performing a task that is used to generate the response. According to some embodiments, generating the response comprises performing the task based on information contained within the intermediate step. In certain embodiments, generating the response to the input prompt comprises using the particular generative machine learning model to rank each reasoning step of the one or more reasoning steps.

Example of a Processing System for a Generative Machine Learning System

Figure 5:
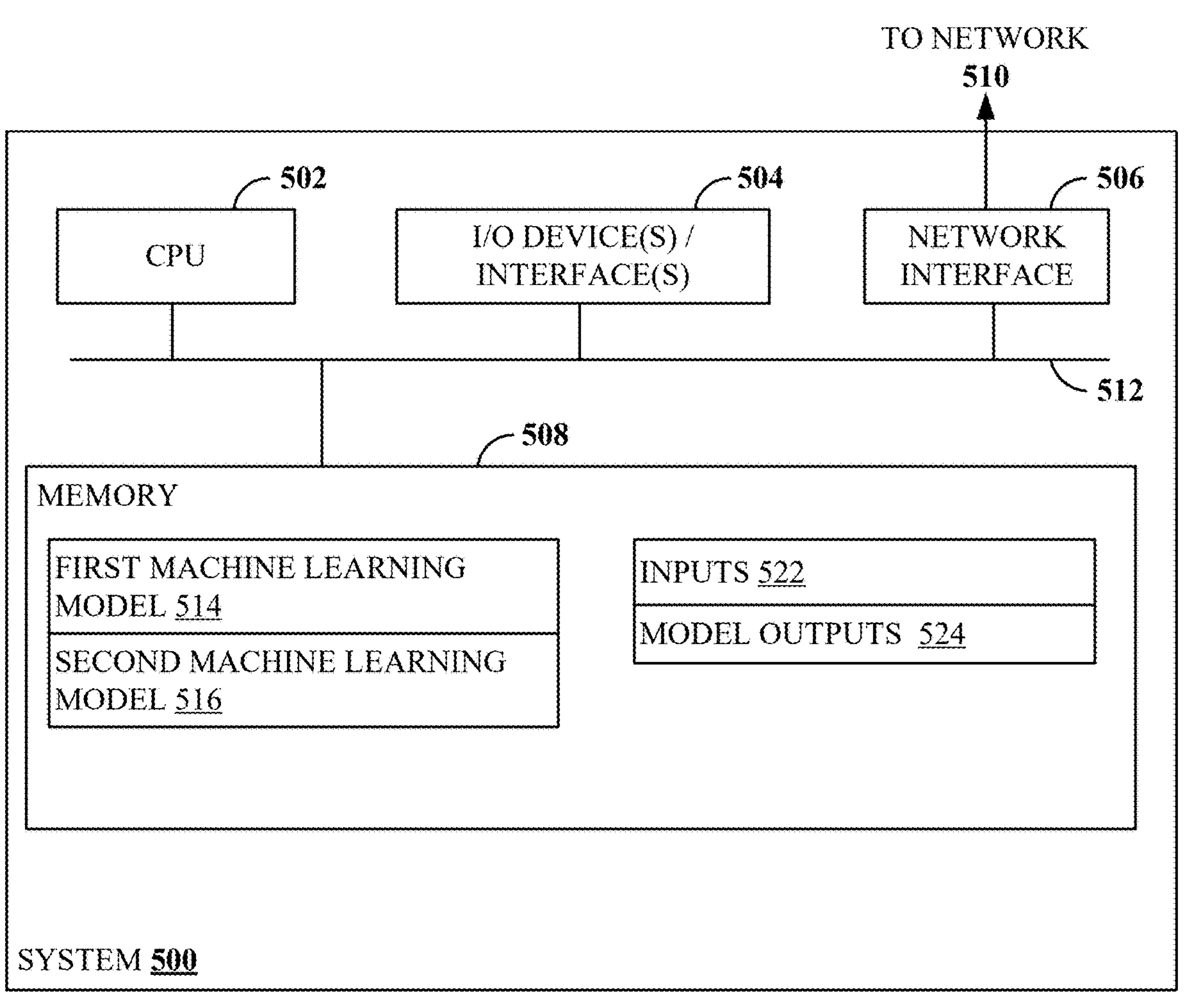
FIG. 5 depicts an example of a processing system according to embodiments disclosed herein.

FIG. 5 illustrates an example system 500 with which embodiments of the present disclosure may be implemented. For example, system 500 may be configured to perform operations 400 of FIG. 4 and/or to implement one or more components as in FIG. 1, FIG. 2, and/or FIG. 3.

System 500 includes a central processing unit (CPU) 502, one or more I/O device interfaces that may allow for the connection of various I/O devices 504 (e.g., keyboards, displays, mouse devices, pen input, etc.) to the system 500, network interface 506, a memory 508, and an interconnect 512. It is contemplated that one or more components of system 500 may be located remotely and accessed via a network 510. It is further contemplated that one or more components of system 500 may comprise physical components or virtualized components.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, and memory 508. CPU 502 is included to be representative of a single CPU, multiple CPUs, a single CPU having multiple processing cores, and other arrangements.

Additionally, the memory 508 is included to be representative of a random access memory or the like. In some embodiments, memory 508 may comprise a disk drive, solid state drive, or a collection of storage devices distributed across multiple storage systems. Although shown as a single unit, the memory 508 may be a combination of fixed and/or removable storage devices, such as fixed disc drives, removable memory cards or optical storage, network attached storage (NAS), or a storage area-network (SAN).

As shown, memory 508 includes first machine learning model 514 and second machine learning model 516. First machine learning model 514 may be representative of first machine learning model 100 of FIG. 1 and/or FIG. 3. Second machine learning model 516 may be representative of second machine learning model 110 of FIG. 1 and/or FIG. 3. First machine learning model 514 and second machine learning model 516 may together be representative of generative machine learning model 200 of FIG. 2.

Memory 508 further comprises inputs 522, which may correspond to input 105 of FIG. 1 and/or FIG. 2. Memory further comprises model outputs 524, which may correspond to response 120 of FIG. 1 and/or FIG. 2.

It is noted that in some embodiments, system 500 may interact with one or more external components, such as via network 510, in order to retrieve data and/or perform operations.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A generative machine learning system, comprising:

one or more processors; and a memory comprising instructions that, when executed by the one or more processors, cause the one or more processors to implement:

a first set of decoder layers configured to generate a first set of logits corresponding to one or more reasoning steps, wherein the first set of decoder layers has a first number of parameters;

a second set of decoder layers configured to generate a second set of logits corresponding to tokens of a response to an input prompt based on the first set of logits, wherein the second set of decoder layers has a second number of parameters, and wherein the second number of parameters is larger than the first number of parameters;

an activation layer configured to generate the response based on the second set of logits; and wherein parameters of the first set of decoder layers are set through a supervised learning process comprising:

providing a training prompt as input to the first set of decoder layers;

comparing an output generated by the first set of decoder layers in response to the training prompt to an output generated by the second set of decoder layers in response to the training prompt, wherein the comparing comprises a semantic similarity comparison involving an embedding representation of a reasoning step generated by a set of encoder layers of the generative machine learning system; and adjusting parameters of the first set of decoder layers based on a variance between the output generated by the first set of decoder layers and the output generated by the second set of decoder layers.

2. The generative machine learning system of claim 1, wherein:

each of the first set of decoder layers and the second set of decoder layers comprises a plurality of neurons organized in an array, wherein each neuron comprises a register, a microprocessor, and at least one input; and each neuron is connected to at least one other neuron via one of a plurality of synaptic circuits, each synaptic circuit including a memory for storing a synaptic weight.

3. The generative machine learning system of claim 1, wherein the activation layer comprises a softmax function that generates a probability distribution for a set of tokens for the response.

4. The generative machine learning system of claim 1, wherein the one or more reasoning steps comprises an intermediate step associated with performing a task that is used to generate the response.

5. A system, comprising:

one or more processors; and a memory comprising instructions that, when executed by the one or more processors, cause the system to:

generate, using a given generative machine learning model comprising a first number of parameters, one or more reasoning steps related to an input prompt;

transmit the one or more reasoning steps to a particular generative machine learning model comprising a second number of parameters, wherein the second number of parameters is larger than the first number of parameters; and generate, using the particular generative machine learning model, a response to the input prompt based on the one or more reasoning steps: wherein the given generative machine learning model is trained through a supervised learning process based on reasoning steps generated by the particular generative machine learning model, the supervised learning process comprising:

providing a training prompt as input to the given generative machine learning model;

comparing a reasoning step generated by the given generative machine learning model in response to the training prompt to a reasoning step generated by the particular generative machine learning model based on the training prompt, wherein the comparing comprises a semantic similarity comparison involving an embedding representation of the reasoning step generated by the given generative machine learning model and an embedding representation of the reasoning step generated by the particular generative machine learning model; and adjusting parameters of the given generative machine learning model based on a variance between the reasoning step generated by the given generative machine learning model and the reasoning step generated by the particular generative machine learning model.

6. The system of claim 5, wherein the one or more reasoning steps comprises an intermediate step associated with performing a task that is used to generate the response.

7. The system of claim 6, wherein generating the response comprises performing the task based on information contained within the intermediate step.

8. The system of claim 5, wherein generating the response to the input prompt comprises using the particular generative machine learning model to rank each reasoning step of the one or more reasoning steps.

9. A method, comprising:

generating, using a given generative machine learning model comprising a first number of parameters, one or more reasoning steps related to an input prompt;

transmitting the one or more reasoning steps to a particular generative machine learning model comprising a second number of parameters, wherein the second number of parameters is larger than the first number of parameters; and generating, using the particular generative machine learning model, a response to the input prompt based on the one or more reasoning steps: wherein the given generative machine learning model is trained through a supervised learning process based on reasoning steps generated by the particular generative machine learning model, the supervised learning process comprising:

providing a training prompt as input to the given generative machine learning model;

comparing a reasoning step generated by the given generative machine learning model in response to the training prompt to a reasoning step generated by the particular generative machine learning model based on the training prompt, wherein the comparing comprises a semantic similarity comparison involving an embedding representation of the reasoning step generated by the given generative machine learning model and an embedding representation of the reasoning step generated by the particular generative machine learning model; and adjusting parameters of the given generative machine learning model based on a variance between the reasoning step generated by the given generative machine learning model and the reasoning step generated by the particular generative machine learning model.

10. The method of claim 9, wherein the one or more reasoning steps comprises an intermediate step associated with performing a task that is used to generate the response.

11. The method of claim 10, wherein generating the response comprises performing the task based on information contained within the intermediate step.

12. The method of claim 9, wherein generating the response to the input prompt comprises using the particular generative machine learning model to rank each reasoning step of the one or more reasoning steps.

* * * * *